United States Patent
Khare et al.

(10) Patent No.: US 12,452,063 B2
(45) Date of Patent: Oct. 21, 2025

(54) NETWORK SECURITY

(71) Applicant: Nokia Technologies Oy, Espoo (FI)

(72) Inventors: Saurabh Khare, Bangalore (IN); Chaitanya Aggarwal, Munich (DE); Anja Jerichow, Munich (DE); Georgios Gkellas, Petroupoli Attikis (GR)

(73) Assignee: Nokia Technologies Oy, Espoo (FI)

( * ) Notice: Subject to any disclaimer, the term of this patent is extended or adjusted under 35 U.S.C. 154(b) by 434 days.

(21) Appl. No.: 17/875,438

(22) Filed: Jul. 28, 2022

(65) Prior Publication Data
US 2023/0030315 A1  Feb. 2, 2023

Related U.S. Application Data (60) Provisional application No. 63/227,359, filed on Jul. 30, 2021.

(51) Int. Cl.
*H04L 29/06* (2006.01)
*H04L 9/32* (2006.01)
*H04L 61/4511* (2022.01)

(52) U.S. Cl.
CPC .......... *H04L 9/3213* (2013.01); *H04L 9/3247* (2013.01); *H04L 9/3263* (2013.01); *H04L 61/4511* (2022.05)

(58) Field of Classification Search
CPC . H04L 9/3213; H04L 61/4511; H04L 9/3247; H04L 9/3263
See application file for complete search history.

(56) References Cited

U.S. PATENT DOCUMENTS

| | | | |
|---|---|---|---|
| 11,196,573 B2* | 12/2021 | Roennow | H04L 63/0435 |
| 11,520,615 B1* | 12/2022 | Iqbal | G06F 9/45558 |
| 12,101,629 B2* | 9/2024 | Martinez De La Cruz | H04W 12/30 |
| 2019/0251241 A1 | 8/2019 | Bykampadi et al. | |

(Continued)

FOREIGN PATENT DOCUMENTS

| | | | |
|---|---|---|---|
| CN | 108632216 B | 10/2020 | |
| EP | 3570515 A1 | 11/2019 | |
| WO | WO-02071282 A1 * | 9/2002 | G06Q 10/087 |

OTHER PUBLICATIONS

3GGP: 3rd Generation Partnership Project; Technical Specification Group Services and System Aspects; 5G; 5G System; Network function repository services; Stage 3 (Release 16). TS 29.510, Nov. 2020, V16.5.0, pp. 56-61 (Year: 2020).*

(Continued)

*Primary Examiner* — Shawnchoy Rahman
(74) *Attorney, Agent, or Firm* — Laine IP Oy

(57) ABSTRACT

According to an example aspect of the present invention, there is provided an apparatus configured to function as a network function repository, and transmit to a network function consumer an access token authorizing access to a service provided by a network function producer, the access token comprising an at least one of: indication of a fully qualified domain name of the network function consumer, an indication of a domain from which access to the network function producer is allowed and an indication of a standalone non-public network from which access to the network function producer is allowed.

14 Claims, 5 Drawing Sheets

(56) References Cited

U.S. PATENT DOCUMENTS

2021/0250172 A1\* 8/2021 Ahmadi ................ H04L 9/3239
2022/0353263 A1\* 11/2022 Choyi ..................... H04L 12/12

OTHER PUBLICATIONS

3GPP; 3rd Generation Partnership Project; Technical Specification Group Services and System Aspects; Digital cellular telecommunications system (Phase 2+) (GSM); UMTS; LTE; 5G; Numbering, addressing and identification (Release 16); TS 23.003, Oct. 2020, V16.3.0, pp. 109-116 (Year: 2020).\*

3GPP: 3rd Generation Partnership Project; Technical Specification Group Services and System Aspects; Security architecture and procedures for 5G system (Release 17). TS 33.501, Jun. 2021, V17.2.1, pp. 1-257 (Year: 2021).\*

3GPP: 3rd Generation Partnership Project; Technical Specification Group Services and System Aspects; Security architecture and procedures for 5G system (Release 17). TS 33.501, Jun. 2021, V17.2.1, pp. 1-257.

\* cited by examiner

NETWORK SECURITY

FIELD

The present disclosure relates to the field of network management and secure provision of services in networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. However, technology disclosed herein has relevance also to wire-line communication networks.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to function as a network function repository, and transmit to a network function consumer an access token authorizing access to a service provided by a network function producer, the access token comprising an at least one of: indication of a fully qualified domain name of the network function consumer, an indication of a domain from which access to the network function producer is allowed and an indication of a stand-alone non-public network from which access to the network function producer is allowed.

According to a second aspect of the present disclosure, there is provided an apparatus comprising at least one processing core, at least one memory including computer program code, the at least one memory and the computer program code being configured to, with the at least one processing core, cause the apparatus at least to function as a network function producer, and process a request for a service provided by the network function producer, received from a network function consumer, the request comprising an access token and a credential element, wherein the access token and the credential element each comprise at least one of: an indication of a fully qualified domain name of the network function consumer, an indication of a domain where the network function consumer resides and an indication of a stand-alone non-public network from which access to the network function producer is allowed.

According to a third aspect of the present disclosure, there is provided an apparatus comprising at least one processing core, at least one memory including computer program code, the at least one memory and the computer program code being configured to, with the at least one processing core, cause the apparatus at least to function as a network function consumer, and transmit a request for a service provided by a network function producer, the request comprising an access token and a credential element, wherein the access token and the credential element each comprise at least one of: an indication of a fully qualified domain name of the network function consumer, an indication of a domain where the network function consumer resides and an indication of a stand-alone non-public network where the network function consumer resides.

According to a fourth aspect of the present disclosure, there is provided a method comprising functioning as a network function repository, and transmitting to a network function consumer an access token authorizing access to a service provided by a network function producer, the access token comprising at least one of: an indication of a fully qualified domain name of the network function consumer, an indication of a domain from which access to the network function producer is allowed and an indication of a stand-alone non-public network from which access to the network function producer is allowed.

According to a fifth aspect of the present disclosure, there is provided a method, comprising functioning as a network function producer and processing a request for a service provided by the network function producer, received from a network function consumer, the request comprising an access token and a credential element, wherein the access token and the credential element each comprise at least one of: an indication of a fully qualified domain name of the network function consumer, an indication of a domain where the network function consumer resides and an indication of a stand-alone non-public network where the network function consumer resides.

According to a sixth aspect of the present disclosure, there is provided a method, comprising functioning as a network function consumer, and transmitting a request for a service provided by a network function producer, the request comprising an access token and a credential element, wherein the access token and the credential element each comprise at least one of: an indication of a fully qualified domain name of the network function consumer, an indication of a domain where the network function consumer resides and an indication of a stand-alone non-public network where the network function consumer resides.

According to a seventh aspect of the present disclosure, there is provided an apparatus comprising means for functioning as a network function repository, and transmitting to a network function consumer an access token authorizing access to a service provided by a network function producer, the access token comprising at least one of: an indication of a fully qualified domain name of the network function consumer, an indication of a domain from which access to the network function producer is allowed and an indication of a stand-alone non-public network from which access to the network function producer is allowed.

According to an eighth aspect of the present disclosure, there is provided an apparatus comprising means for functioning as a network function producer, and processing a request for a service provided by the network function producer, received from a network function consumer, the request comprising an access token and a credential element, wherein the access token and the credential element each comprise at least one of: an indication of a fully qualified domain name of the network function consumer, an indication of a domain where the network function consumer resides and an indication of a stand-alone non-public network where the network function consumer resides.

According to a ninth aspect of the present disclosure, there is provided an apparatus comprising means for functioning as a network function consumer, and transmitting a request for a service provided by a network function producer, the request comprising an access token and a credential element, wherein the access token and the credential element each comprise at least one of: an indication of a fully qualified domain name of the network function consumer and/or an indication of a domain where the network function consumer resides and an indication of a stand-alone non-public network where the network function consumer resides.

According to a tenth aspect of the present disclosure, there is provided a non-transitory computer readable medium having stored thereon a set of computer readable instructions that, when executed by at least one processor, cause an apparatus to at least function as a network function repository, and transmit to a network function consumer an access token authorizing access to a service provided by a network function producer, the access token comprising at least one of: an indication of a fully qualified domain name of the network function consumer, an indication of a domain from which access to the network function producer is allowed and an indication of a stand-alone non-public network from which access to the network function producer is allowed.

According to an eleventh aspect of the present disclosure, there is provided a non-transitory computer readable medium having stored thereon a set of computer readable instructions that, when executed by at least one processor, cause an apparatus to at least function as a network function producer, and process a request for a service provided by the network function producer, received from a network function consumer, the request comprising an access token and a credential element, wherein the access token and the credential element each comprise least one of: an indication of a fully qualified domain name of the network function consumer, an indication of a domain where the network function consumer resides and an indication of a stand-alone non-public network where the network function consumer resides.

According to a twelfth aspect of the present disclosure, there is provided a non-transitory computer readable medium having stored thereon a set of computer readable instructions that, when executed by at least one processor, cause an apparatus to at least function as a network function consumer, and transmit a request for a service provided by a network function producer, the request comprising an access token and a credential element, wherein the access token and the credential element each comprise least one of: an indication of a fully qualified domain name of the network function consumer, an indication of a domain where the network function consumer resides and an indication of a stand-alone non-public network where the network function consumer resides.

EMBODIMENTS

In a service-based architecture where access tokens are used to authorize access to services provided by network function producers, the access tokens may be furnished with a fully qualified domain name, FQDN, and/or domain of the network function consumer which is authorized with the token to access at least one service. By thus authorizing the FQDN, or a domain, the network function producer is enabled to check that service requests it receives, the requests including the access token, are not tampered to divert the service to an incorrect FQDN or domain. Likewise a credential element the network function consumer presents in its service request may be furnished with FQDN and/or domain information, to enable the network function producer to verify the request is from a node authorized to access the service.

Figure 1:
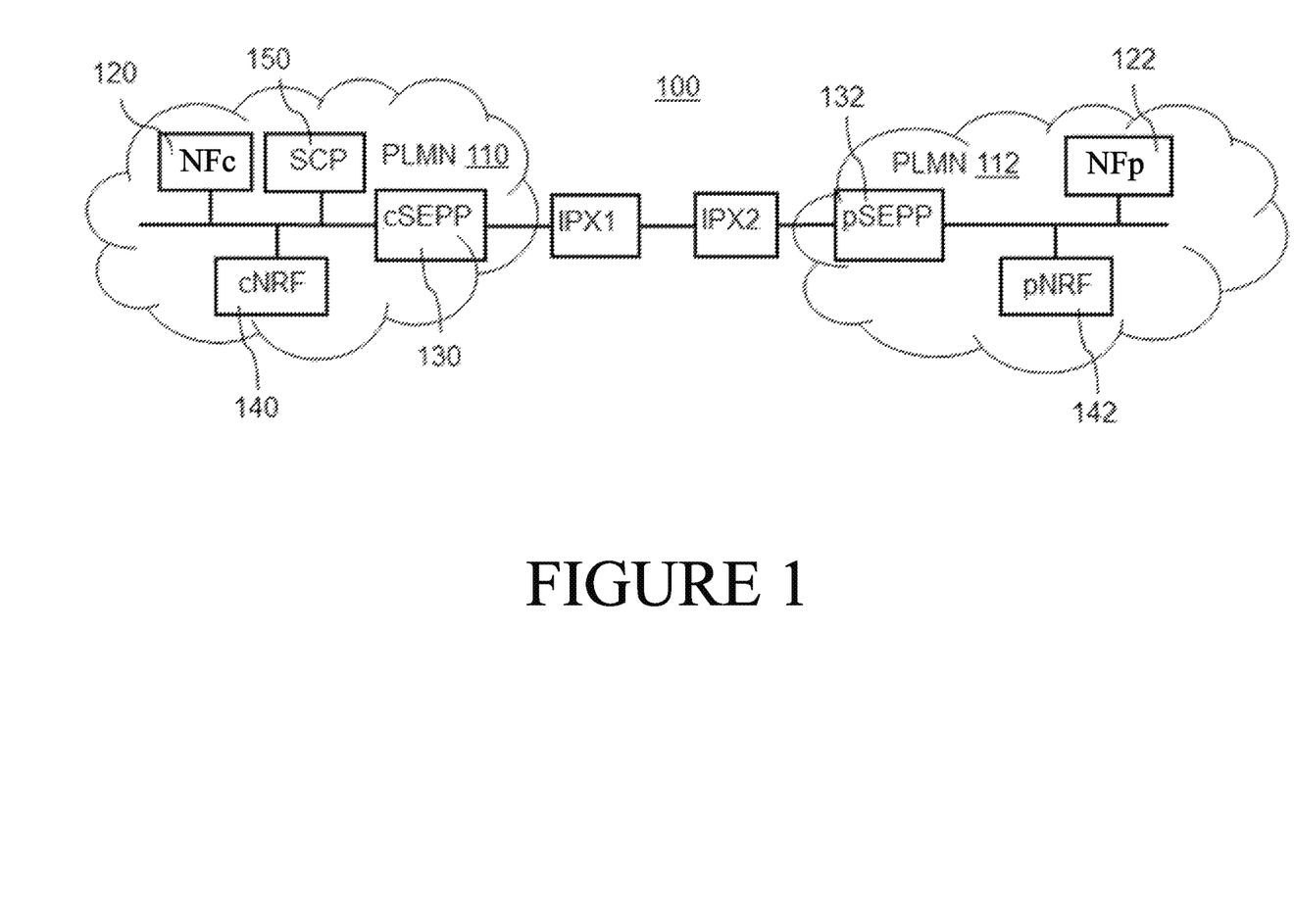
FIG. 1 illustrates an example system in accordance with at least some embodiments of the present invention.

FIG. 1 illustrates an example system 100 in accordance with at least some embodiments of the present invention. The system comprises two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. Examples of such network functions include a resource control or management function, session management or control function, interworking, data management or storage function, authentication function or a combination of one or more of these functions.

In case of a third generation partnership project, 3GPP, fifth generation, 5G, system service based architecture, SBA, core network, NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCF, and an application function, AF. A NEF is configured to provide access to exposed network services and capabilities. A UDM is configured to manage network user data in a single, centralized element. The PLMNs each may further comprise a security edge protection proxy, SEPP, 130, 132 configured to operate as a security edge node or gateway. The NFs may communicate with each other using representational state transfer, REST, application programming interfaces, for example. These may be known as RESTful APIs. Further examples of NFs include NFs related to gaming, streaming or industrial process control. The system may comprise also nodes from 3G or 4G node systems, such as home subscriber server, HSS, and a suitable interworking function for protocol translations between e.g. Diameter and JSON-based RESTful APIs. While described herein primarily using terminology of 5G systems, the principles of the invention are applicable also to other communication networks using proxies as described herein, such as 4G networks and non-3GPP networks, as well as wire-line communication networks, for example.

While the example of FIG. 1 has two PLMNs 110, 112, in general at least some embodiments of the invention may be practiced in a single PLMN, which need not necessarily have SEPPs. In a two-PLMN case, in FIG. 1, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, communication takes place between a service-consuming NF and a service-producing NF, henceforth referred to as NFc 120 and NFp 122. They may also be referred to as NF service consumer and NF service producer, or more briefly network function consumer and network function producer, respectively. As noted, the NFc and NFp may reside in the same PLMN or in different PLMNs.

A service communication proxy, SCP, 150 may be deployed for indirect communication between network functions, NFs. An SCP is an intermediate network entity to assist in indirect communication between an NFc and an NFp, including routing messages, such as, for example, control plane messages between the NFs, and optionally including discovering and selecting NFp 122 on behalf of NFc 120 or requesting an access token from the NRF 140, 142 or an Authorization Server on behalf of NFc 120 to access the service of NFp 122. An SCP is an example of a proxy entity.

Direct communication may be applied between NFc 120 and NFp 122 for an NF service, or NF service communication may be performed indirectly via proxy entities, such as SCP(s) 150. In direct communication, the NFc 120 performs discovery of the target NFp 122 by local configuration or via NRF 140, 142. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF.

NF discovery and NF service discovery enable entities, such as NFc or SCP, to discover a set of NF instance(s) and NF service instance(s) for a specific NF service or an NFp type. The NFc and/or the SCP may be core network entities. The network repository function, NRF, may comprise a function that is used to support the functionality of NF and NF service registration, discovery, authorization and status notification. Additionally, or alternatively, the NRF may be configured to act as an authorization server. The NRF may maintain an NF profile of available NFp entities and their supported services. The NRF may notify about newly registered, updated, or deregistered NFp entities along with its NF services to a subscribed NFc or SCP. An NRF may thus notify NFc entities or SCP(s) concerning where, that is, from which NFp entities, they may obtain services they need. An NRF may be co-located together with an SCP, for example, run in a same physical computing substrate. Alternatively, NRF may be in a physically distinct node than an SCP.

When registering a service in an NRF, the NFp offering the service may impose one or more limitations on which NFc nodes may access the service. These limitations may be defined in terms of FQDN, domain and/or SNPN, for example, as will be described in more detail herein below.

In order for the NFc 120 or SCP 150 to obtain information about NFp 122 and/or NF service(s) registered or configured in a PLMN/slice, NFc 120 or SCP 150 may initiate, based on local configuration, a discovery procedure with an NRF, such as cNRF 140. The discovery procedure may be initiated by providing the type of the NFp and optionally a list of the specific service(s) the NFc or SCP is attempting to discover. The NFc 120 or SCP 150 may additionally or alternatively provide other service parameters, such as information relating to network slicing.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In some embodiments OAuth based service authorization and/or access token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server, for example. The NFc may be an OAuth client and the NFp may operate as OAuth resource server, and they may be configured to support OAuth authorization framework as defined in RFC 6749, for example. An NFc, or an SCP acting on behalf of the NFc, may send two separate requests to an NRF, firstly a discovery request to which the NRF responds by offering concerning suitable NFp entities, and secondly an access token request concerning one of the suitable NFp entities. The NRF may respond to the access token request by providing the requested access token if it decides to grant access, and by a refusal in case the NRF decides to not grant access.

In general, a network support function such as an NRF may further be configured to act as an authorization server, and provide the NFc, or an SCP acting on behalf of the NFc, with a cryptographic access token authorizing the NFc to use the service provided by the NFp. In general, an NRF is a terminological example of a network support node. In general, an SCP is a terminological example of a proxy entity. The NFc and/or SCP may include the access token in a request message when requesting the service from the NFp, for example in an "authorization bearer" header. Such an access token may be referred to herein briefly as a token. For example, the NRF may act as an OAuth 2.0 authentication server. An access token may comprise, for example, one, more than one or all of the following fields:

Access Token
Iss: NF Instance ID of NRF issuing the token
Sub: NF Instance ID of NFc
Aud: NF Instance ID of NFp providing the service
scope: indication of NF service(s) for which the token authorizes access
exp: validity time indication of the token
FQDN: FQDN of NFc
Domain: NFc Domain
SNPN: SNPN the NFc belongs to for requests toward NFp The token may comprise e.g. NF instance identifiers of the NFc, NRF and/or NFp, a validity identifier, scope of the specific service which is authorised for the NFc with the token. In particular, the access token may comprise the FQDN and/or the domain of the NFc. Alternatively, or additionally to the FQDN and/or the domain, the access token may comprise the SNPN of the NFc.

The token may be cryptographically signed using a private key of the NRF. The afore-mentioned parameters, comprised in the access token, may be in scope of the signature, meaning the integrity of these parameters may be verified by verifying the signature. A validity of such a cryptographic signature may be verified using the corresponding public key of the NRF, which the NFp may obtain in connection with registering with the NRF the service(s) it offers, for example. When the NFc contacts the NFp, it may present the access token, which the NFp may then verify, for example at least in part by using its copy of the public key of the NRF. A message authentication code, MAC, based cryptographic signature may be used in some embodiments instead of, or in addition to, a public-key-cryptography based signature. Issuing an access token via a service communication proxy may comprise the proxy using the access token on behalf of the NFc with or without forwarding it to the NFc. In some cases, an NFc may use indirect routing via a proxy entity when requesting the access token from the NRF, and then use direct routing without proxy entities when requesting the service from the NFp, using the access token.

When requesting a service from an NFp, an NFc or an SCP acting on behalf of the NFc may include in a service request the access token authorizing access to the service, and a credential element, such as client credentials assertion, CCA, of the NFc and/or the SCP. A CCA may comprise, for example, one, more than one or all of the following fields:

Credential element (NFc)
sub: NFc Instance id
iat: Issue Time
exp: Expiry time
aud: NFp, NRF
FQDN: NFc FQDN
Domain: NFc Domain
SNPN: SNPN the NFc belongs to for requests toward NFp Here sub is an NF instance identifier of the NFc which generates this CCA. Here iat is a timestamp declaring the time of issue of the CCA, and exp an expiry time of the CCA. Here aud is a list of NF types expected to process the CCA, in this example the CCA is aimed at use in NFp entities. The FQDN parameter is an indication of the fully qualified domain name of the NFc. The Domain is a domain in which the NFc is comprised, and the SNPN parameter, where present, denotes a stand-alone non-public network where the NFc is comprised. In particular, the credential element may comprise the FQDN and/or the domain. Alternatively, or additionally to the FQDN and/or the domain, the credential element may comprise the SNPN.

Use of access tokens and credential elements comprising NFc FQDN, NFc domain or NFc SNPN information controls against an attack where a legitimate service request is tampered with before it reaches the NFp, to forge the NFc FQDN in the request in a bid to divert the requested service to another domain, FQDN or SNPN. Thus, a technical effect is achieved in more secure provision of service, which may be a service involving private information of network subscribers, for example. The information in the credential element guarantees that the NFc FQDN and/or domain and/or SNPN is not manipulated while the request is being routed to the NFp. With the information in the access token the producer is assured that the information in the credential element is genuine and that the NFc did not insert an incorrect FQDN/domain/SNPN.

Figure 2:
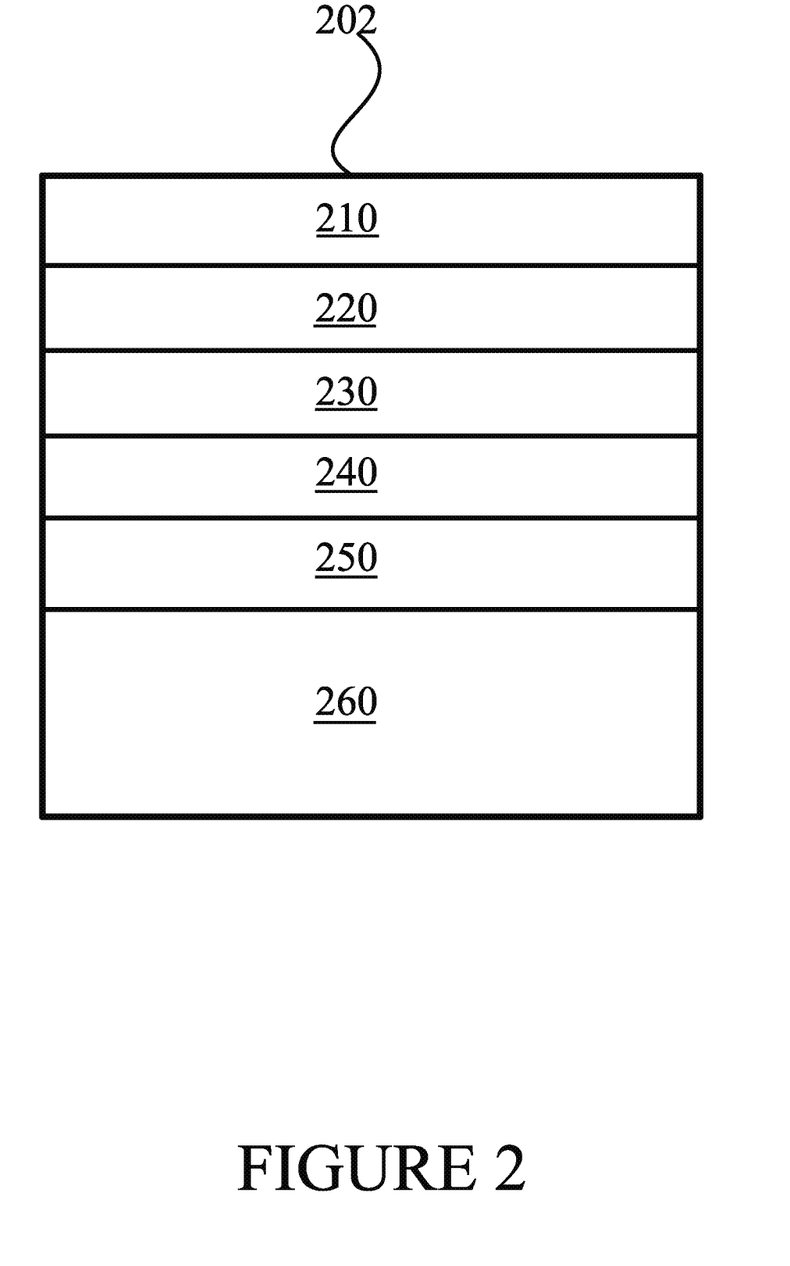
FIG. 2 illustrates an example credential element in accordance with at least some embodiments of the present invention.

FIG. 2 illustrates an example credential element in accordance with at least some embodiments of the present invention. A credential element, such as, for example, a CCA or a transport layer security, TLS, certificate, 202, comprises the following fields. Field 210 comprises an identifier of the NFc whose credential element this is, in other words, field 210 comprises an identifier of the NFc. Field 220 comprises an issue time, indicating a moment in time when the NFc has constructed the credential element. Field 230 comprises an expiry time, indicating a latest point in time when credential element 202 may be accepted. After this time, messages carrying this credential element should be refused, since the NFc should not try to use an expired credential element and attempts to use an expired credential element are warning signs of attempts to abuse the system. The NFc can always generate a new credential element and is not constrained to use an expired one.

Field 240 comprises an FQDN of the NFc, as discussed herein above. Field 250 comprises the domain of the NFc. Finally, field 260 comprises a cryptographic signature obtained over fields 210, 220, 230, 240 and 250 and other parameters, if present in the credential element. In other words, fields 210, 220, 230, 240 and 250 are provided to a cryptographic signature algorithm as input, and the signature obtained as output is stored in field 260. The signature may be obtained using asymmetric encryption or MAC encryption, for example. As noted above, the credential element may further, or alternatively comprise an SNPN identifier.

A NRF or NFp may validate the credential element by verifying the signature from field 260, using a public key from a certificate of the NFc node which has issued credential element 202. Further, the certificate of the NFc may comprise an indication of the NFc FQDN and/or domain. As part of validating the credential element, the NFp may check that the domain from field 250 matches a domain indication in the access token and/or the certificate of the NFc. The certificate is cryptographically signed by an entity other than the NFc, wherefore the NFc cannot impersonate being another node, or impersonate being comprised in a different domain than the one where it actually is comprised in. Likewise, the SCP or other proxy entity cannot modify the credential element, as it lacks the key needed to update the signature in field 260 to account, for example, for changing the domain in field 250.

In general, credential elements may be expected to be more short-lived than NRF-generated access tokens. So, they can be used in deployments with requirements for tokens with shorter lifetime for NF-NF communication. There is a trade-off that when the lifetime of the credential element is too short, it requires the NF Service Consumer to generate a new credential element for every new service request. The credential element may comprise a X.509 URL (x5u) to refer to a resource for the public key certificate or certificate chain used for signing the client authentication assertion, or a X.509 Certificate Chain (x5c) indicating the X.509 public certificate or certificate chain used for signing the credential element.

Figure 3:
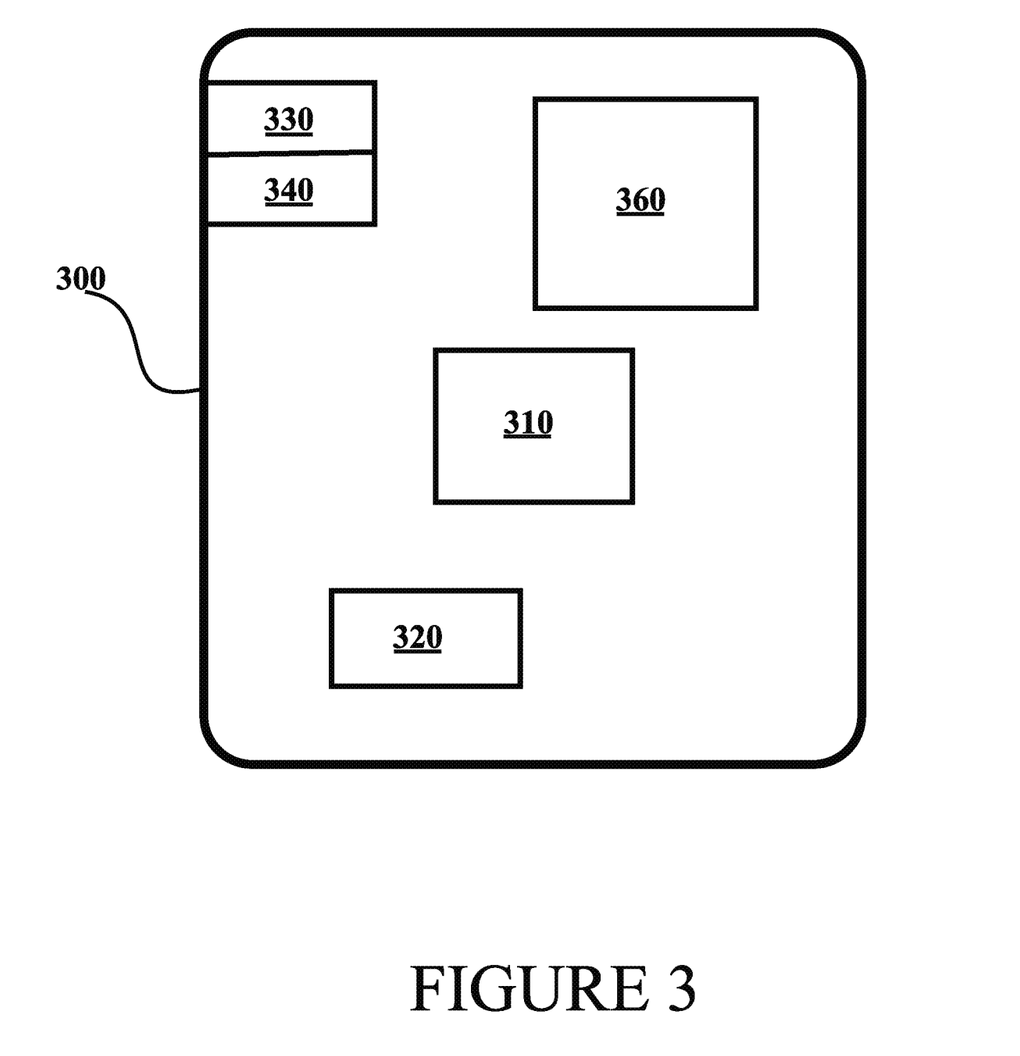
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device of PLMN 110 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Xeon processor. Processor 310 may comprise at least one application-specific integrated circuit, ASIC. Processor 310 may comprise at least one field-programmable gate array, FPGA. Processor 310 may constitute means for performing method steps in device 300, such as functioning, transmitting, receiving, signing, including, processing, refusing, rejecting and verifying. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure access parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively, to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively, to a serial bus, the receiver may comprise a parallel bus receiver. Device 300 may comprise further devices not illustrated in FIG. 3.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
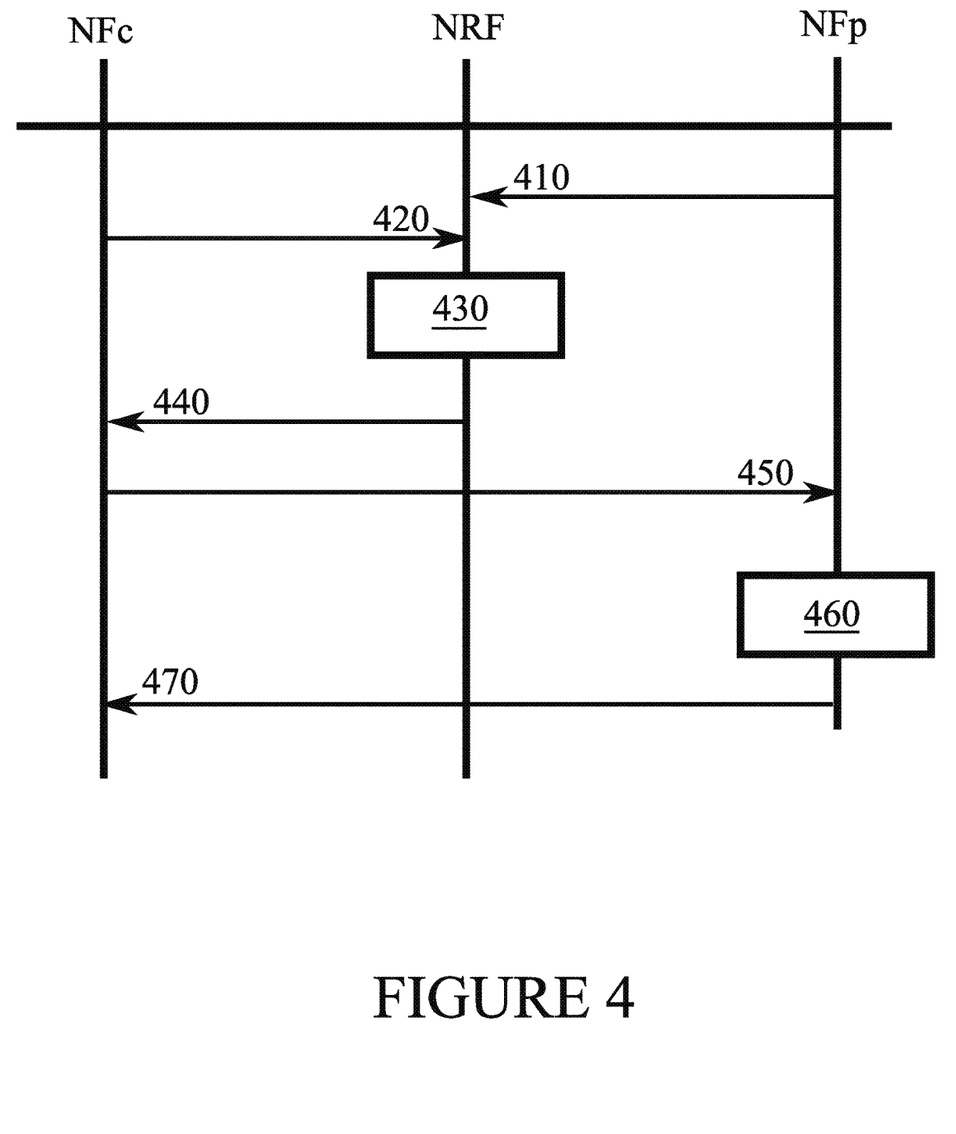
FIG. 4 illustrates signalling in accordance with at least some embodiments of the present invention.

FIG. 4 illustrates signalling in accordance with at least some embodiments of the present invention. On the vertical axes are disposed, on the left, the NFc, in the centre, the NRF and and on the right, the NFp. Time advances from the top toward the bottom.

In phase 410, the NFp registers with the NRF to inform the NRF of at least one service it is willing to perform. In the registering process, the NFp may indicate to the NRF an FQDN range or FQDN list defining thereby an FQDN limitation on authorizations for the service. Likewise, the NFp may indicate a domain or domain list to define a domain limitation on authorizations for the service, or an SNPN or SNPN list to define an SNPN limitation on authorizations for the service.

In phase 420, the NFc requests an access token from the NRF, this access token to authorize the NFc to access the service(s) provided by the NFp. The access token request of phase 410 may comprise the credential element of the NFc, for example a credential element such as the one illustrated in FIG. 2.

In phase 430, the NRF decides whether to issue the requested access token. For example, the NRF may determine if the requesting NFc complies with an FQDN, domain and/or SNPN limitation the NFp defined in phase 410. For example, the NRF may verify that the NFc's FQDN is in the FQDN list or FQDN range provided by the NFp. If a limitation defined by the NFp is not complied with by the NFc, the NRF may refuse the access token request of phase 420. Otherwise, the NRF may perform other authorization determinations concerning the NFc and processes the access token request in phase 430. In case the NRF decides to authorise the NFc to access the service, it constructs the access token and sends it to the NFc in phase 440. The access token may be signed by the NRF. The NRF may also use the public certificate of the NFc, in particular a key comprised in this certificate, to check the cryptographic signature of the credential element.

In phase 450, the NFc requests the service from the NFp. The request of phase 450 comprises the access token received in phase 440, and the credential element of the NFc. In case time elapses between phases 420 and 450 to the extent that the credential element included in the access token request of phase 420 has expired, the NFc can compile a new credential element and include the new credential element in the request of phase 450.

In phase 460, the NFp analyses the request of phase 450. The NFp may verify the access token by checking a cryptographic signature on the access token, the signature being of the NRF, or other authorisation server, which issued the token. Further, the NFp may check, using a public certificate of the NFc, that the cryptographic signature on the credential element of the NFc is correct. The NFp may also check, that any limitations it imposed in phase 410 are complied with, in particular, that the access token and the credential element comprise the same, or compatible, FQDN, domain and/or SNPN of the NFc.

In case the analysis of phase 460 indicates that the request of phase 450 is allowable, the NFp may deliver the requested service to the NFc, phase 470.

Figure 5:
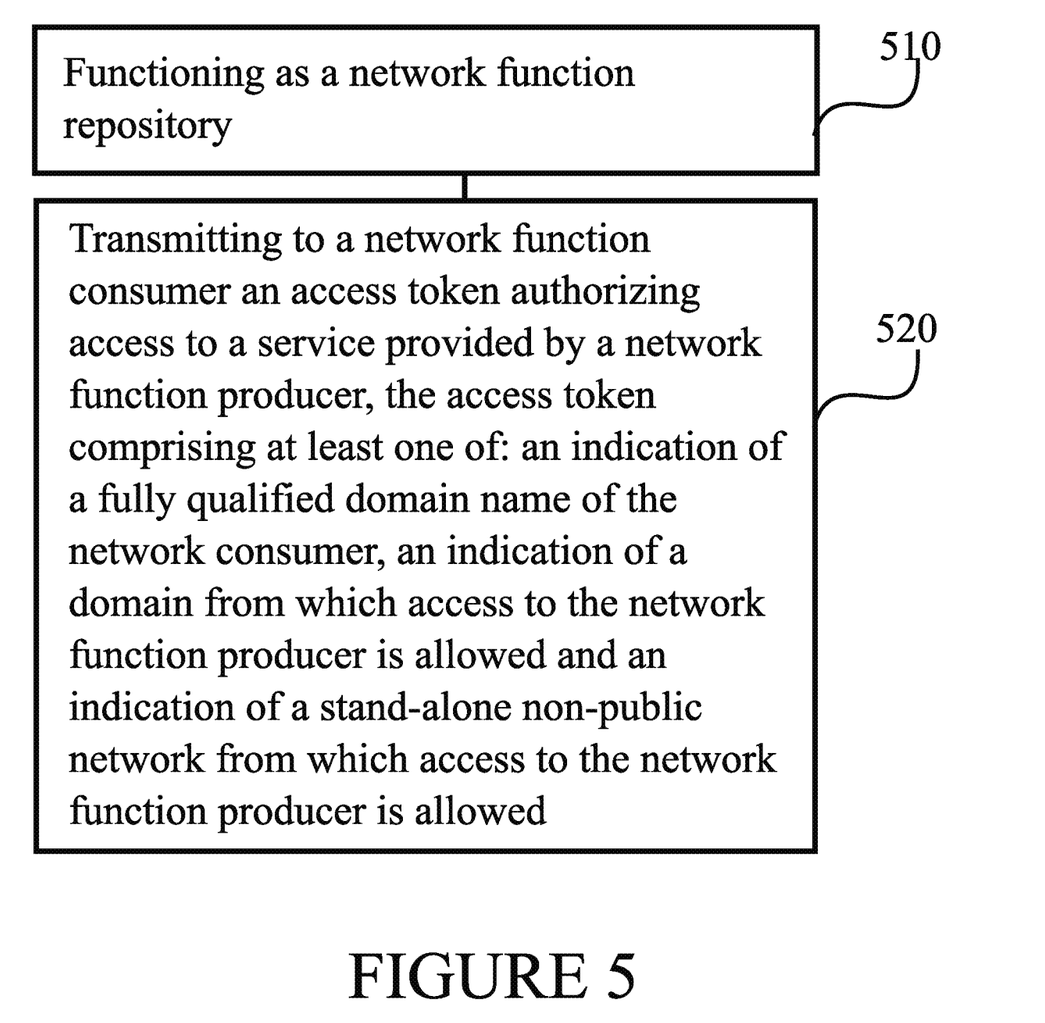
FIG. 5 is a flow graph of a method in accordance with at least some embodiments of the present invention.

FIG. 5 is a flow graph of a method in accordance with at least some embodiments of the present invention. The phases of the illustrated method may be performed in the NRF, or in a control device configured to control the functioning thereof, when installed therein.

Phase 510 comprises functioning as a network function repository. Phase 520 comprises transmitting to a network function consumer an access token authorizing access to a service provided by a network function producer, the access token comprising at least one of: an indication of a fully qualified domain name of the network function consumer, an indication of a domain from which access to the network function producer is allowed and an indication of a stand-alone non-public network from which access to the network function producer is allowed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in network operation.

Acronyms List

CCA client credentials assertion
FQDN fully qualified domain name
SNPN stand-alone non-public network
UDM unified data management

The invention claimed is:

1. An apparatus comprising at least one processing core, at least one memory including computer program code, the at least one memory and the computer program code being configured to, with the at least one processing core, cause the apparatus at least to:
 function as a network function repository, and
 transmit to a network function consumer an access token authorizing access to a service provided by a network function producer, the access token comprising an at least one of: an indication of a fully qualified domain name of the network function consumer, an indication of a domain as a domain limitation, whereby access to the network function producer is disallowed from outside the domain, and an indication of a stand-alone non-public network from which access to the network function producer is allowed, and
 receive from the network function producer the indication of the domain and a list of fully qualified domain names from which access to the network function producer is allowed, the list comprising the fully qualified domain name of the network function consumer.

2. The apparatus according to claim 1, wherein the apparatus is configured to receive the indication of the domain from the network function producer in connection with a registration of the network function producer with the network function repository.

3. The apparatus according to claim 1, wherein the apparatus is configured to cryptographically sign the access token using a private key of the network function repository.

4. An apparatus comprising at least one processing core, at least one memory including computer program code, the at least one memory and the computer program code being configured to, with the at least one processing core, cause the apparatus at least to:
 function as a network function producer, and
 process a request for a service provided by the network function producer, received from a network function consumer, the request comprising an access token and a credential element, wherein the access token and the credential element each comprise at least one of: an indication of a fully qualified domain name of the network function consumer, an indication of a domain where the network function consumer resides and an indication of a stand-alone non-public network from which access to the network function producer is allowed, and
 provide to a network function repository the indication of the domain as a domain limitation, whereby access to the network function producer is disallowed from outside the domain, and a list of fully qualified domain names from which access to the network function producer is allowed, the list comprising the fully qualified domain name of the network function consumer.

5. The apparatus according to claim 4, wherein the apparatus is configured to reject the request in case the indications of fully qualified domain name of the network function consumer and/or network function consumer domain in the access token and the credential element do not match.

6. The apparatus according to claim 4, wherein the apparatus is configured to verify that a cryptographic signature over the credential element is correct by using a certificate of the network function consumer, the certificate of the network function consumer comprising an indication of the fully qualified domain name and/or the domain of the network function consumer.

7. The apparatus according to claim 4, wherein the apparatus is configured to verify that a first indication of a stand-alone non-public network, in the credential element, matches a second indication of a stand-alone non-public network, in the access token, and in case the first indication and the second indication do not match, to reject the request.

8. A method comprising:
 functioning as a network function repository, and
 transmitting to a network function consumer an access token authorizing access to a service provided by a network function producer, the access token comprising at least one of: an indication of a fully qualified domain name of the network function consumer, an indication of a domain as a domain limitation, whereby access to the network function producer is disallowed from outside the domain and an indication of a stand-alone non-public network from which access to the network function producer is allowed, and
 receiving from the network function producer the indication of the domain and a list of fully qualified domain names from which access to the network function producer is allowed, the list comprising the fully qualified domain name of the network function consumer.

9. The method according to claim 8, wherein the indication of the domain is received from the network function producer in connection with a registration of the network function producer with the network function repository.

10. The method according to claim 8, further comprising cryptographically signing the access token using a private key of the network function repository.

11. A method, comprising:
 functioning as a network function producer, and
 processing a request for a service provided by the network function producer, received from a network function consumer, the request comprising an access token and a credential element, wherein the access token and the credential element each comprise at least one of: an indication of a fully qualified domain name of the network function consumer, an indication of a domain where the network function consumer resides and an indication of a stand-alone non-public network where the network function consumer resides, and
 providing to a network function repository the indication of the domain as a domain limitation, whereby access to the network function producer is disallowed from outside the domain and a list of fully qualified domain names from which access to the network function producer is allowed, the list comprising the fully qualified domain name of the network function consumer.

12. The method according to claim 11, further comprising rejecting the request in case the indications of fully qualified domain name of the network function consumer and/or network function consumer domain in the access token and the credential element do not match.

13. The method according to claim 11, further comprising verifying that a cryptographic signature over the credential element is correct by using a certificate of the network function consumer, the certificate of the network function consumer comprising an indication of the fully qualified domain name and/or the domain of the network function consumer.

14. The method according to claim 11, further comprising verifying that a first indication of a stand-alone non-public network, in the credential element, matches a second indication of a stand-alone non-public network, in the access token, and in case the first indication and the second indication do not match, to rejecting the request.

* * * * *